(12) United States Patent
Zumdome et al.

(10) Patent No.: US 9,332,688 B2
(45) Date of Patent: May 10, 2016

(54) SEED-DOUBLE ELIMINATOR FOR A PLANTING UNIT

(71) Applicant: Deere & Company, Moline, IL (US)

(72) Inventors: Lee E. Zumdome, Bettendorf, IA (US); Nathan A. Mariman, Geneseo, IL (US)

(73) Assignee: Deere & Company, Moline, IL (US)

( * ) Notice: Subject to any disclaimer, the term of this patent is extended or adjusted under 35 U.S.C. 154(b) by 128 days.

(21) Appl. No.: 14/170,207

(22) Filed: Jan. 31, 2014

(65) Prior Publication Data

US 2015/0216112 A1    Aug. 6, 2015

(51) Int. Cl.
*A01C 7/04*    (2006.01)
*A01C 7/20*    (2006.01)

(52) U.S. Cl.
CPC . *A01C 7/046* (2013.01); *A01C 7/04* (2013.01); *A01C 7/20* (2013.01)

(58) Field of Classification Search
CPC ............ A01C 7/04; A01C 7/00; A01C 7/042; A01C 7/044; A01C 7/046; A01C 7/20
See application file for complete search history.

(56) References Cited

U.S. PATENT DOCUMENTS

| | | | |
|---|---|---|---|
| 2,960,258 A | 11/1960 | Dowdell | |
| 4,450,979 A | 5/1984 | Deckler | |
| 5,170,909 A | 12/1992 | Lundie et al. | |
| 5,842,428 A | 12/1998 | Stufflebeam et al. | |
| 6,273,010 B1 | 8/2001 | Luxon | |
| 6,352,042 B1 | 3/2002 | Martin et al. | |
| 6,928,941 B1 | 8/2005 | Sternitzke | |
| 7,093,548 B2 | 8/2006 | Eben et al. | |
| 7,152,542 B2 | 12/2006 | Eben et al. | |
| 7,162,963 B2 | 1/2007 | Sauder et al. | |
| 7,699,009 B2 | 4/2010 | Sauder et al. | |
| 7,798,080 B2 | 9/2010 | Sauder et al. | |
| 8,746,159 B2 | 6/2014 | Garner et al. | |
| 2002/0088383 A1 | 7/2002 | Barry et al. | |
| 2005/0204972 A1 | 9/2005 | Eben et al. | |
| 2010/0192818 A1 | 8/2010 | Garner et al. | |
| 2010/0192819 A1 | 8/2010 | Garner et al. | |

FOREIGN PATENT DOCUMENTS

DE          2517758       11/1976
WO      2010059101 A1    5/2010

OTHER PUBLICATIONS

European Search Report for Related Application No. EP15152469, Dated June 18, 2015.

*Primary Examiner* — Christopher J Novosad
(74) *Attorney, Agent, or Firm* — Ingrassia, Fisher & Lorenz PC

(57) ABSTRACT

A seed-double eliminator is described for a seeding machine that moves seed along a seed path. The seed-double eliminator may include a mounting fixture mounted in a fixed position relative to the seed path and a slide member mounted to the mounting fixture. Various flexible extensions, such as various brushes, may extend from the slide member toward the seed path. The various flexible extensions may thereby contact at least one seed of a seed-double pair being moved along the seed path by the seeding machine in order to remove the at least one seed from the seed path. The slide member may be configured to mount to the mounting fixture in various locations, thereby altering the distance that the flexible extensions extend toward the seed path. A seed deflector may also be provided, for directing seed toward a seed pool after the seed has been removed from the seed path.

18 Claims, 13 Drawing Sheets

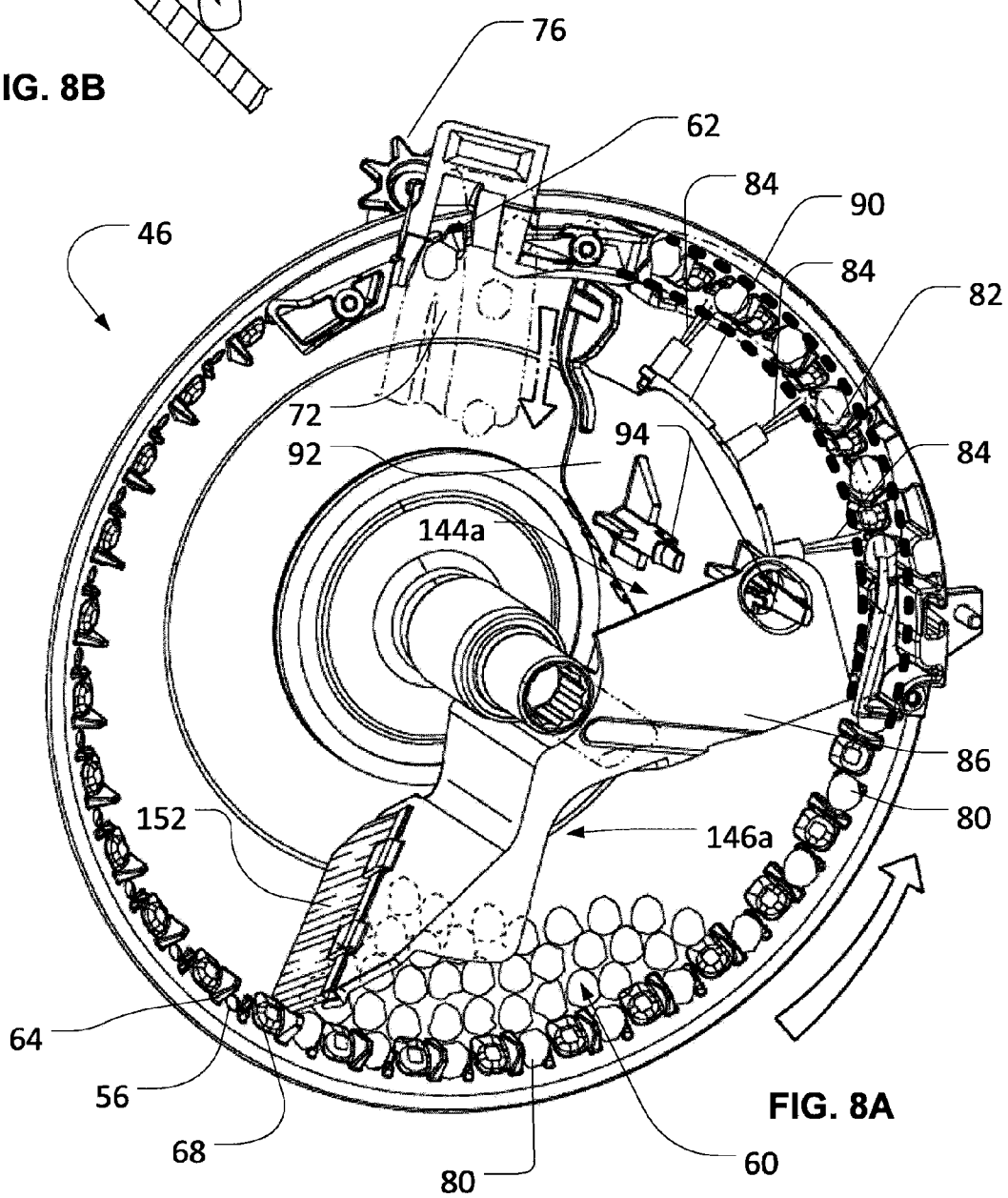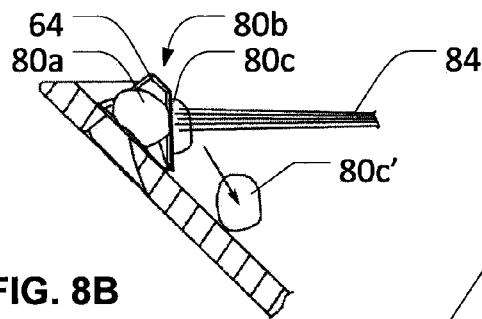
FIG. 8B
FIG. 8A

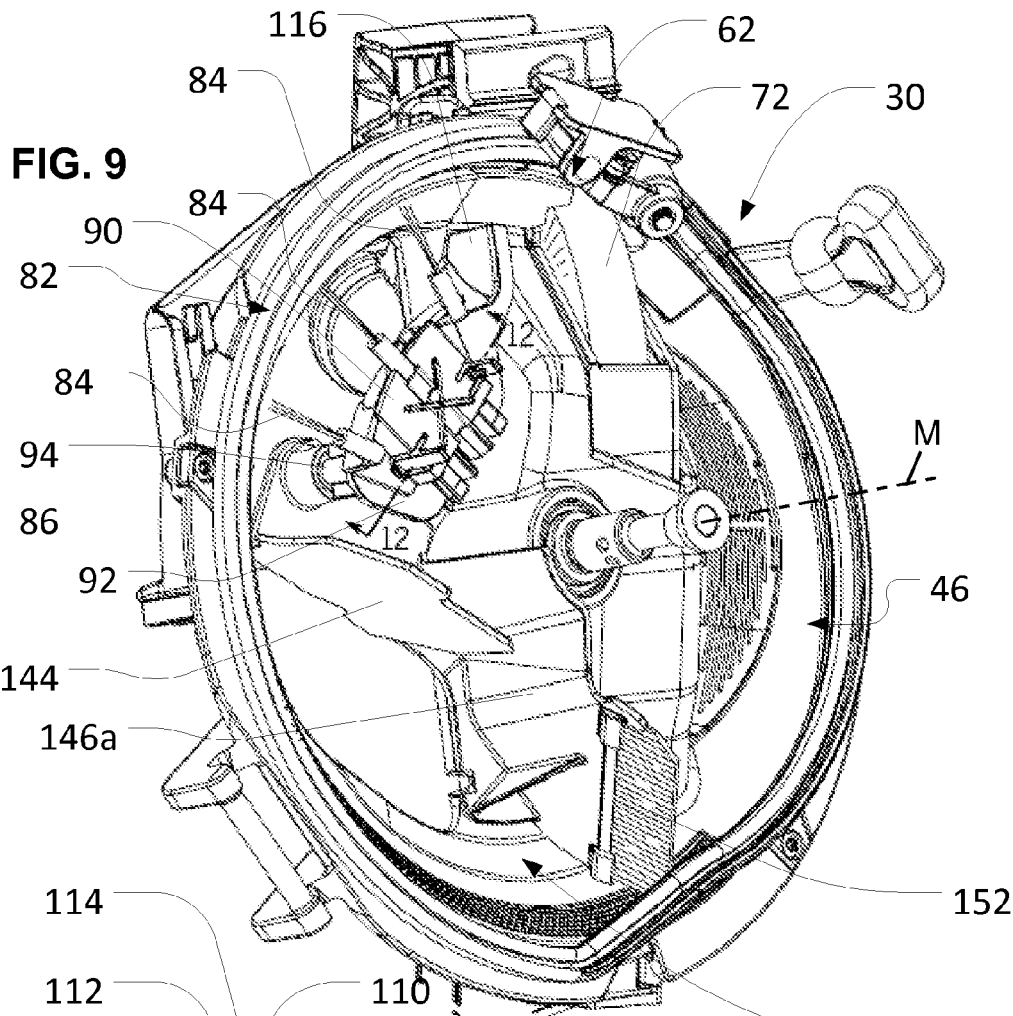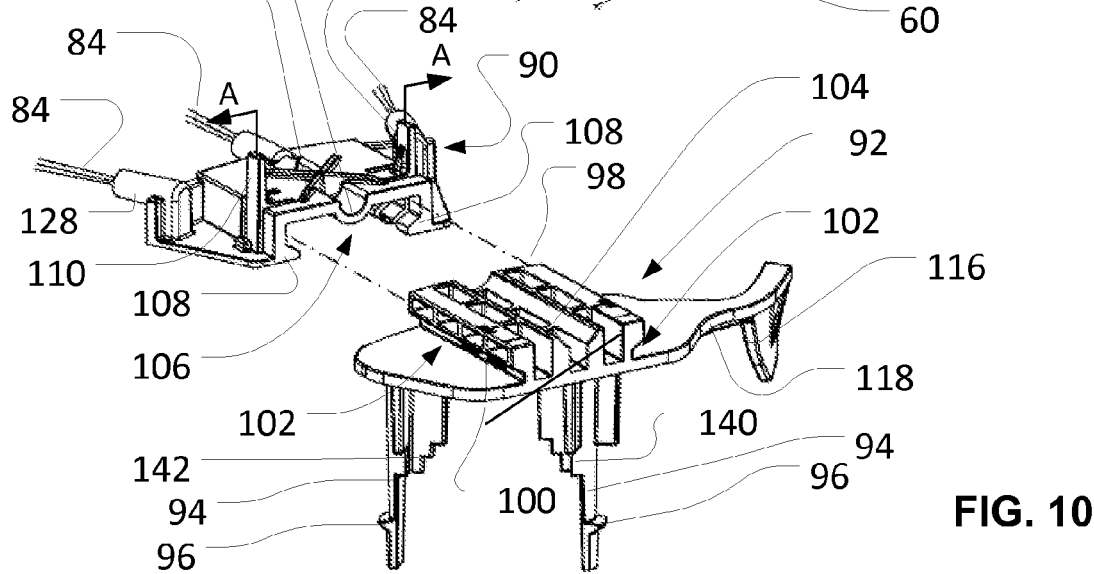

SEED-DOUBLE ELIMINATOR FOR A PLANTING UNIT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The following relates to planting units for a seeding machine or planter, including planting units having seed meters.

BACKGROUND OF THE DISCLOSURE

Various types of seed meters have been developed that use an air pressure differential, either vacuum or positive pressure, to adhere seed to a metering member. The metering member takes seed from a seed pool and sequentially discharges single seeds at another location. (In some cases, multiple seeds may be discharged at a time.) One common type of seed meter is shown in U.S. Pat. No. 5,170,909. There, a seed disk contained in a housing is used to meter the seed. A seed pool is positioned on one side of the disk at a lower portion thereof while vacuum is applied to the opposite side of the disk. As the disk is rotated, individual seeds from the seed pool are adhered by the vacuum to apertures that extend though the disk. When the seed reaches a desired release position, the vacuum is terminated, allowing the seed to drop from the disk.

In this and other configurations of seed meters (and other seed transport devices), it may be useful to ensure that seed doubles are eliminated. A seed double may occur, for example, when two (or more) seeds are captured by a single portion of a seed meter (e.g., a vacuum aperture of a seed meter) or device for transport between locations (e.g., between a seed pool and a release position for the seed). Because it may be desirable to plant (or otherwise process) only one seed at a time, it may be useful to provide an apparatus that eliminates such seed doubles.

SUMMARY OF THE DISCLOSURE

A seed-double eliminator and planter are disclosed, for removing seed doubles from a seed meter of a planter or other similar apparatus.

A seeding machine may be configured to move seed along a seed path. In certain embodiments, a seed-double eliminator (or planter) for may include a mounting fixture mounted in a fixed position relative to the seed meter and a slide member mounted to the mounting fixture. One or more flexible extensions may extend from the slide member toward the seed path, in order to contact at least one seed of a seed-double pair being moved along the seed path by the seeding machine and remove the at least one seed from the seed path.

Multiple flexible extensions may be provided for the slide member, with various of the extensions oriented at an angle with respect to other extensions. The slide member may be movable between different mounting locations on the mounting fixture, with different mounting locations for the slide member corresponding to the flexible extensions being extended different distances toward (including into) the seed path. One or more pinch members may be used to fix the slide member to the mounting fixture at the various mounting locations, including by way of various engagement portions on the pinch members and the mounting fixture. A seed deflector with various deflection surfaces may be mounted to the mounting fixture, to direct a seed toward a seed pool of the planting unit. A hinged flap, brush or other flexible member may be provided on the seed deflector and may extend into the seed pool. The seed deflector may be mounted to the mounting fixture.

BRIEF DESCRIPTION OF THE DRAWINGS

FIG. 8A is an elevational view of certain internal components of the seed meter of FIG. 4, including a mounting fixture and a slide member, taken from a first side of the metering member of FIG. 5;

FIG. 8B is a detailed view of a seed being dislodged from a seed double in the context of the seed meter of FIG. 8A;

FIG. 9 is another elevational view of certain internal components of the seed meter of FIG. 4, including a mounting fixture and a slide member, taken from a generally opposite perspective of FIG. 8A;

FIG. 10 is a perspective view of a mounting fixture and a slide member included in the seed meter of FIG. 9;

Like reference symbols in the various drawings indicate like elements.

DETAILED DESCRIPTION

Figure 1:
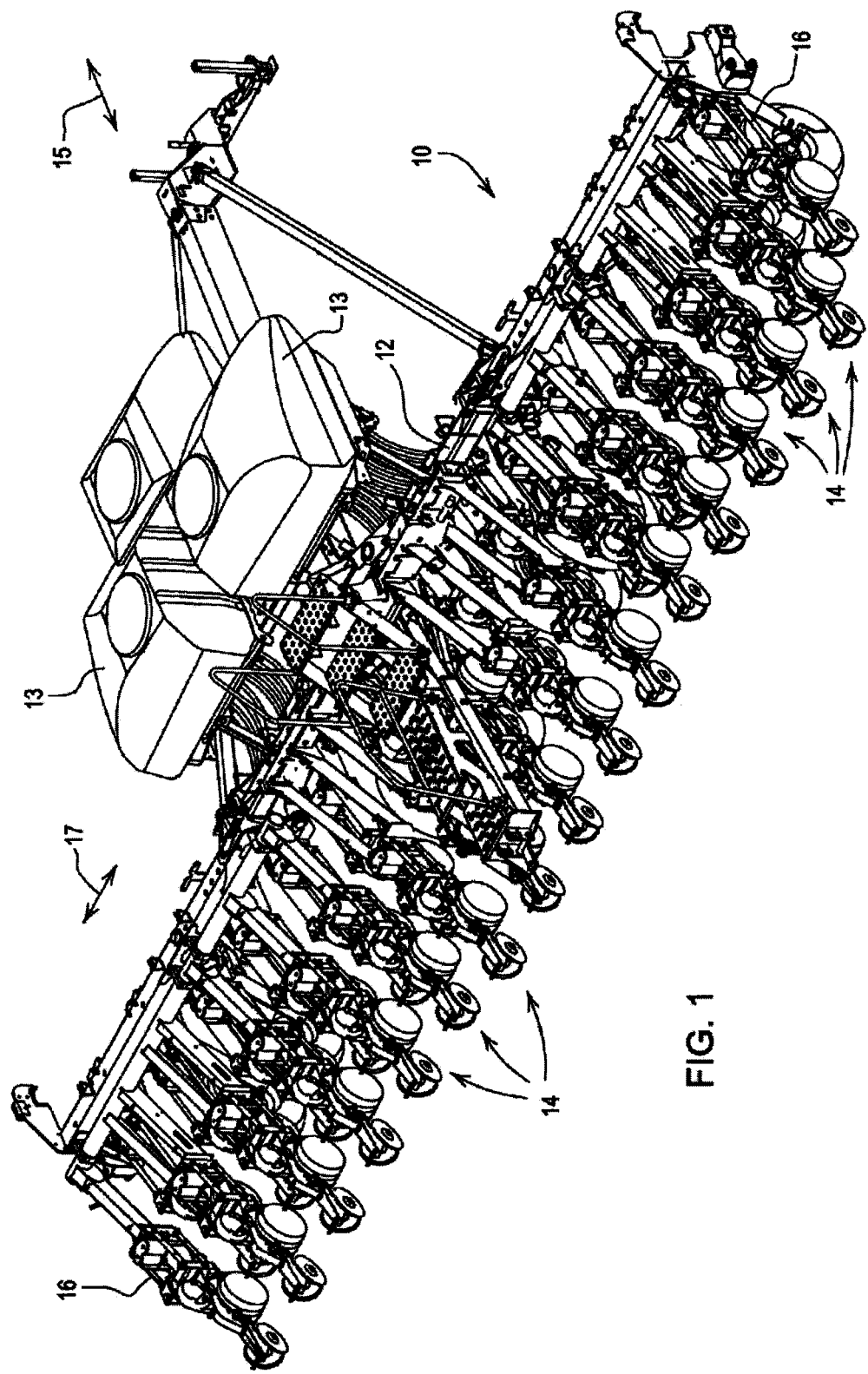
FIG. 1 is a perspective view of a common agricultural planter.

The following describes one or more example embodiments of the disclosed seed-double eliminator, as shown in the accompanying figures of the drawings described briefly above. Various modifications to the example embodiments may be contemplated by one of skill in the art.

As also noted above, it may be useful to provide an apparatus to eliminate seed doubles within a planting unit (e.g., a seeding machine or associated planter). For example, a disk-shaped (or other) metering member within the planting unit may move seed along a generally circular (or other) seed path from a seed pool to an elevated release position. Seed doubles may sometimes be formed on such a metering member, and may be carried along the circular path, potentially resulting in undesirable seed delivery (e.g., poor or failed transport for final planting by a seed delivery system). A seed-double eliminator may accordingly assist in more efficient and successful seed delivery by removing one or more seeds from various seed doubles on the metering member. (It will be understood that "double," as used herein, may refer to any grouping of multiple seeds, including groupings of three or more seeds.)

In one embodiment of a seed-double eliminator, various flexible extensions (e.g., various flexible brushes) may be configured to extend toward (and into) the seed path of the metering member. Through contact with one or more seeds included in various seed doubles, these extensions may act to remove the one or more seeds from the metering member, thereby reducing the number of seed doubles that reach the release position. Notably, seeds within a seed double may extend farther away from the metering member than a single seed being carried by the metering member. In addition to other benefits, such flexible members may take advantage of this phenomenon in order to more selectively eliminate seed doubles.

In certain embodiments, the extent to which the flexible extensions extend into a seed path may be variable, including through mechanisms subject to in-field adjustment. For example, a mounting fixture may be fixed in place with respect to the seed meter (or other component of the planting unit) so that the mounting fixture is relatively stationary with respect to the metering member while the metering member transports seed (e.g., from a seed pool to a release position). Another component, to which various flexible extensions (e.g., brushes) may be attached, may be configured to adjustably attach to the mounting fixture in order to permit, for example, adjustment of the extension of various of the extensions toward (and into) the seed path. For example, a slide member with attached brushes may be configured to slide onto a mounting fixture, such that at a first mounting location (i.e., a first position on the mounting fixture) the slide member is oriented to cause the brushes to extend a first distance toward (including, in certain embodiments, into) the seed path, and at a second mounting location (i.e., a second position on the mounting fixture) the slide member is oriented to cause the brushes to extend a second distance toward (including, in certain embodiments, into) the seed path. This may be useful in a variety of circumstances, including to allow adjustment of the seed-double eliminator to address various sizes or types of seeds (e.g., based on nominal or average seed characteristics).

In certain embodiments, other features may also be included. For example, various deflection surfaces may be included in order to direct seeds that are dislodged by the flexible extensions back towards a seed pool, so that the dislodged seeds may be re-captured by the metering member (or other device) for transport to the release position (or other location).

Referring now to FIG. 1, example agricultural seeding machine 10 is shown as a row crop planter. It will be understood that various other configurations may also be possible and that the disclosed seed-double eliminator may be used in a variety of agricultural machinery or other settings. Seeding machine 10 may include central frame 12 on which a plurality of individual planting units 14 may be mounted. Seeding machine 10 may be oriented with a fore-aft direction shown by arrow 15 and a transverse direction shown by arrow 17. Each planting unit 14 may be coupled to central frame 12 by a parallel linkage (e.g. linkage 16) so that individual planting units 14 may move up and down to a limited degree relative to frame 12. Large storage tanks 13 may hold seed that may be delivered pneumatically to a mini-hopper on each planting unit.

Figure 2:
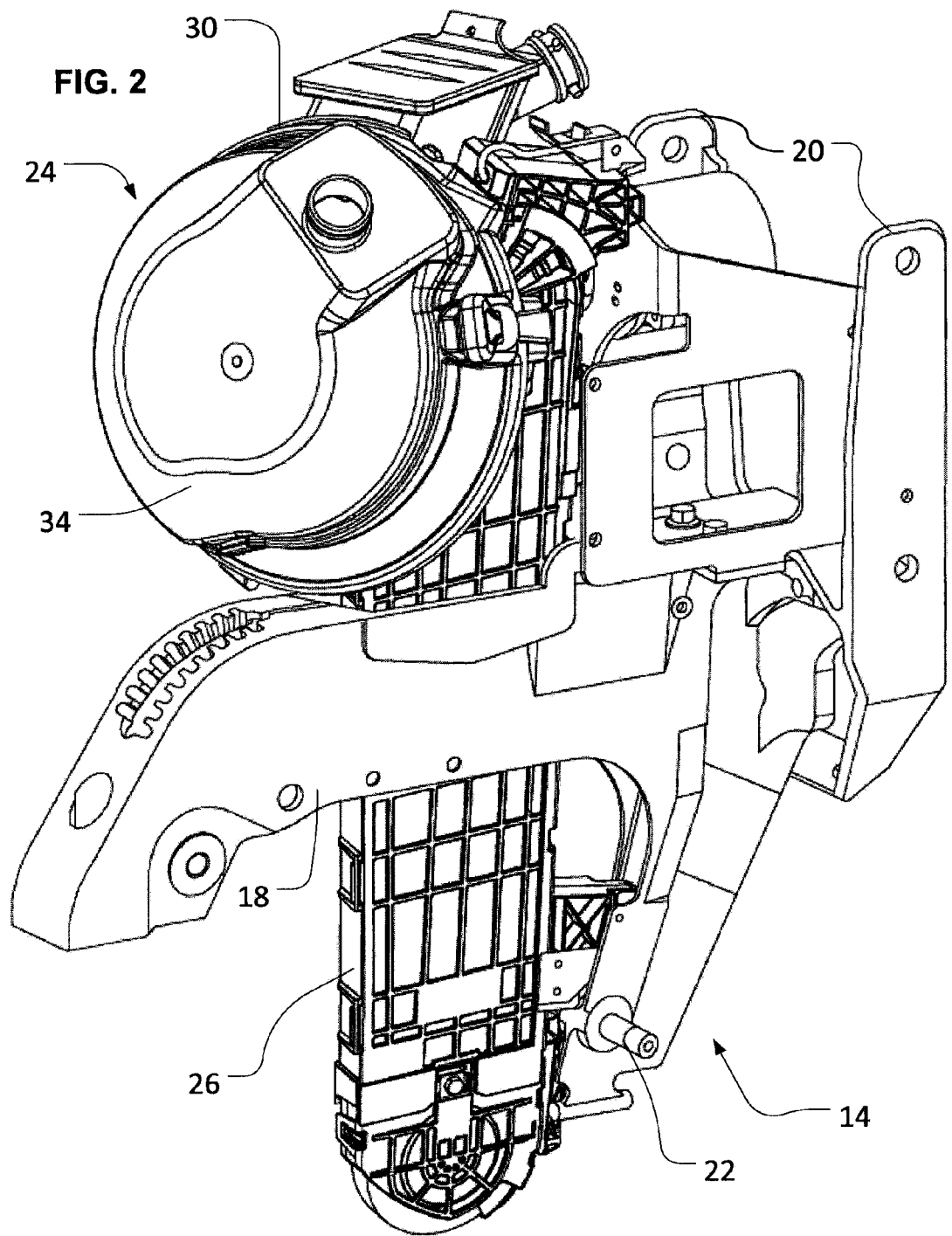
FIG. 2 is a side perspective view of a planting unit frame, seed meter and seed delivery system.

Referring also to FIG. 2, each planting unit 14 may be mounted, in various known ways, to frame member 18. (It will be understood that the disclosed seed-double eliminator may be utilized with planting unit 14, or with various other seed-handling or other devices (not shown).) Frame member 18 may include a pair of upstanding arms 20 at the forward end thereof. Arms 20 may be coupled to the rearward ends of parallel linkage 16. Furrow opening disks (not shown) may be attached to shaft 22 in a known manner to form an open furrow in the soil beneath the seeding machine into which seed is deposited. Closing and packing wheels (not shown) may also be mounted to frame member 18 in a known manner to close the furrow over the deposited seed and to firm the soil in the closed furrow. Seed meter 24 and seed delivery system 26 (depicted without a cover in FIG. 2) may also be attached to the frame member 18 of the planting unit.

Figure 3:
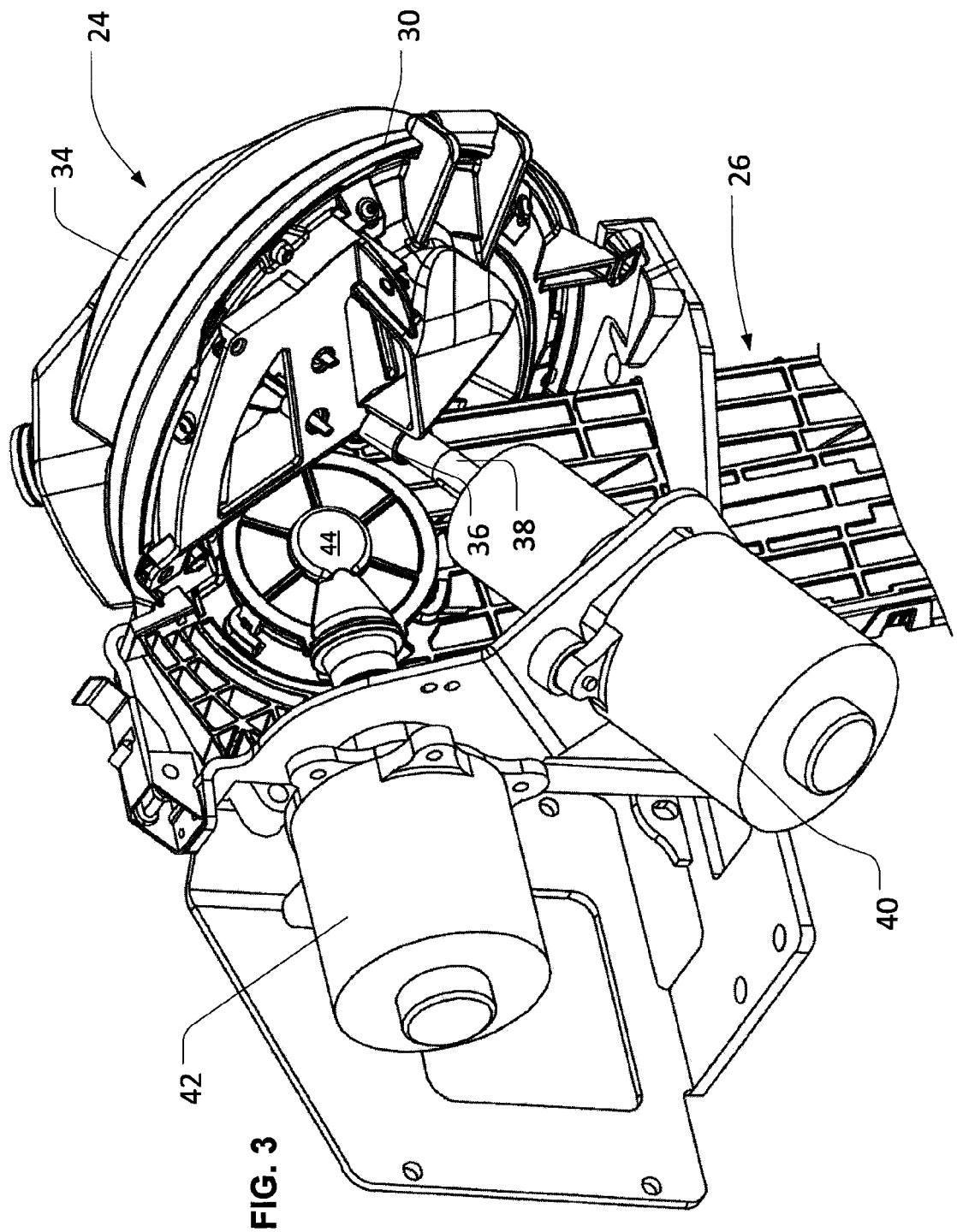
FIG. 3 is an enlarged perspective view of the seed meter and delivery system drives.
Figure 4:
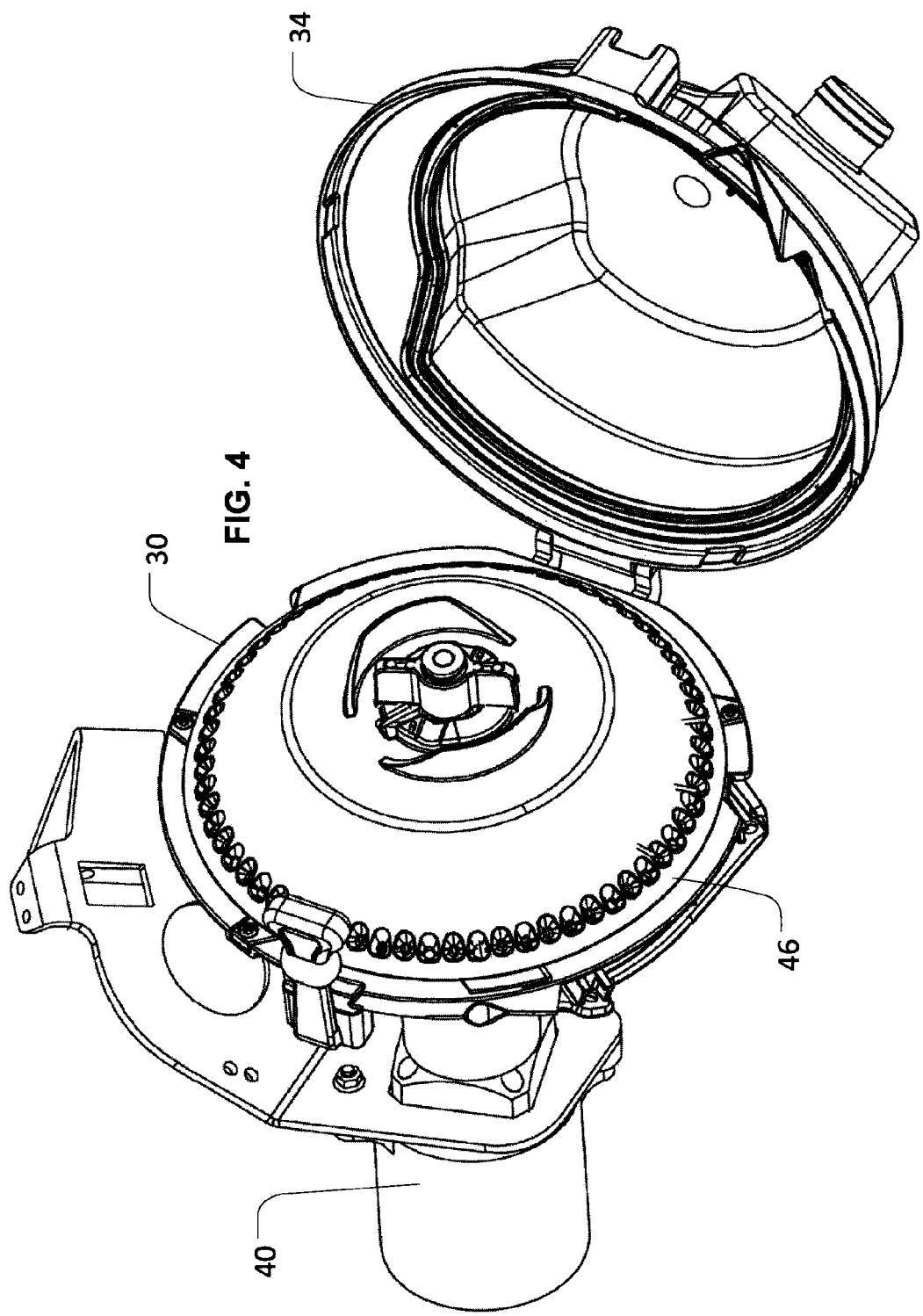
FIG. 4 is a perspective view of the seed meter with the cover open illustrating the metering member.

Referring also to FIGS. 3 and 4, seed meter 24 may include housing 30 and cover 34. Housing 30 and the cover 34 may be coupled to one another by complementary hinge features on housing 30 and cover 34, respectively. Drive spindle 36 may be carried by the housing 30 and may be couple to output shaft 38 of electric motor 40, in order to drive the seed meter when in the assembled position shown in FIG.

Delivery system 26 may be driven by electric motor 42. The output shaft of motor 42 may be connected to delivery system 26 through right-angle drive 44. While electric motors have been shown to drive both the seed meter and the seed delivery system, it will be appreciated by those skilled in the art that other types of motors, (e.g., hydraulic, pneumatic, and so on) can be used as well as various types of mechanical drive systems.

Figure 5:
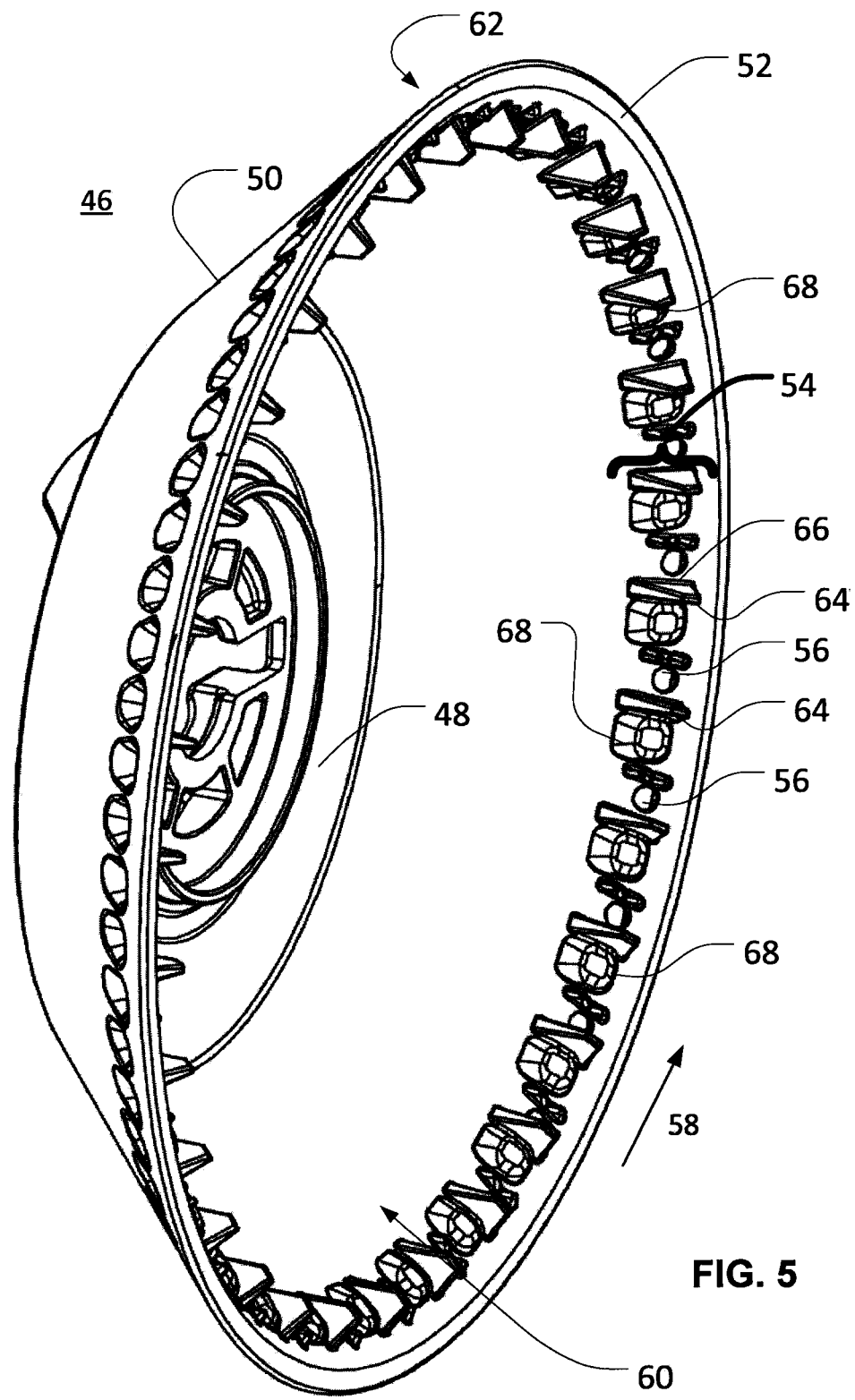
FIG. 5 is a perspective view of a metering member included in the seed meter of FIG. 4.
Figure 6:
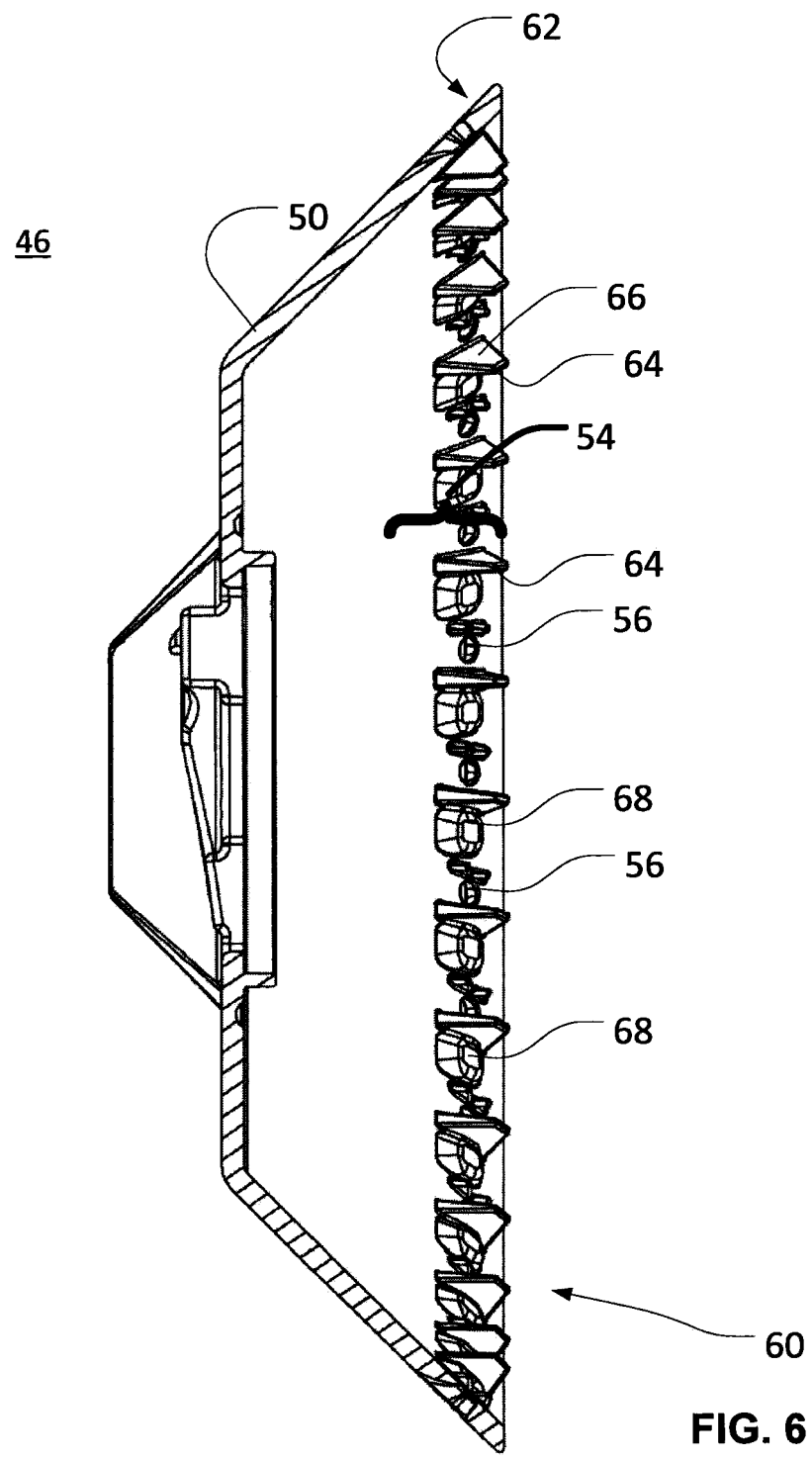
FIG. 6 is side cross-section of the metering member of FIG. 5.

Referring also to FIGS. 5 and 6, metering member 46 of seed meter 24 is shown in greater detail. Metering member 46 may be (as shown) a concave bowl-shaped body. The bowl-shaped body may have base portion 48 from which side wall 50 extends. Side wall 50 may terminate in outer edge 52. Adjacent outer edge 52, side wall 50 may include rim portion 54, as indicated by bracket in FIGS. 5 and 6, which may extend radially outwardly and axially toward outer edge 52. Within rim portion 54, an annular array of apertures 56 may extend between the inner and outer surfaces of side wall 50.

Metering member 46 may be mounted in meter housing 30 for movement about a metering axis "M" (see FIG. 9), such as for rotation in the direction of arrow 58 in FIG. 5. In operation, as the metering member rotates, individual seeds from seed pool 60 (see also, e.g., FIG. 8A) located at a bottom portion of metering member 46 may adhere to apertures 56 on the inner surface of side wall 50 and thereby be sequentially carried upward to release position 62 at an upper portion of metering member 46. (In the discussion herein, "upper," and similar descriptions, may be used with respect to a particular orientation of metering member 46 (or other components of planting unit 14) depicted in the figures. It will be understood, however, that various components may be oriented differently.) A series of raised features or projections, such as paddles 64, may extend from the inner surface of side wall 50. In certain embodiments, one paddle may be located behind each aperture 56, with respect to direction of rotation 58. Each paddle 64 may, accordingly, form a confronting surface 66 behind the associated aperture in the direction of rotation to push a seed adhered to the aperture into delivery system 26 as described below. In certain embodiments, metering member 46, as installed in housing 30, may be oriented at an angle from vertical (not shown in FIG. 6).

In certain embodiments, metering member 46 may include raised geometry 68 between sets of paddles 64. In operation, such geometry 68 may sometimes serve to orient individual seeds in a seed double for better removal by a seed-double eliminator. For example, with multiple seeds 80 being carried between a set of paddles 64, geometry 68 may permit one seed to seat at or near the associated aperture 56, while orienting the other seed (or seeds) away from side wall for easier removal.

A metering member (or other seed transport device) may be formed as one piece or constructed of multiple pieces, and may differ in various ways from example metering member 46 depicted in the various figures herein. It will be understood, accordingly, that the disclosed seed-double eliminator may be used with a metering member such as metering member 46, or with various other types of seed transport devices.

As noted above, seed pool 60 may formed at the bottom of metering member 46. Vacuum may be applied to the outer surface of side wall 50, causing individual seeds to be adhered to various apertures 56 as the apertures travel through the seed pool. As metering member 46 rotates as shown by arrow 58, seed may thereby be moved upward to release position 62 at the upper portion of metering member 46. Release position 62 may be slightly past the top or 12 o'clock position on the circular path of travel of the seed such that the seed is moving somewhat downward at the release position. Seed delivery system 26 may be positioned beneath the upper portion of metering member 46 at the release position 62 to take the seed from the metering member (e.g., as shown in FIGS. 7 and 8A).

Figure 7:
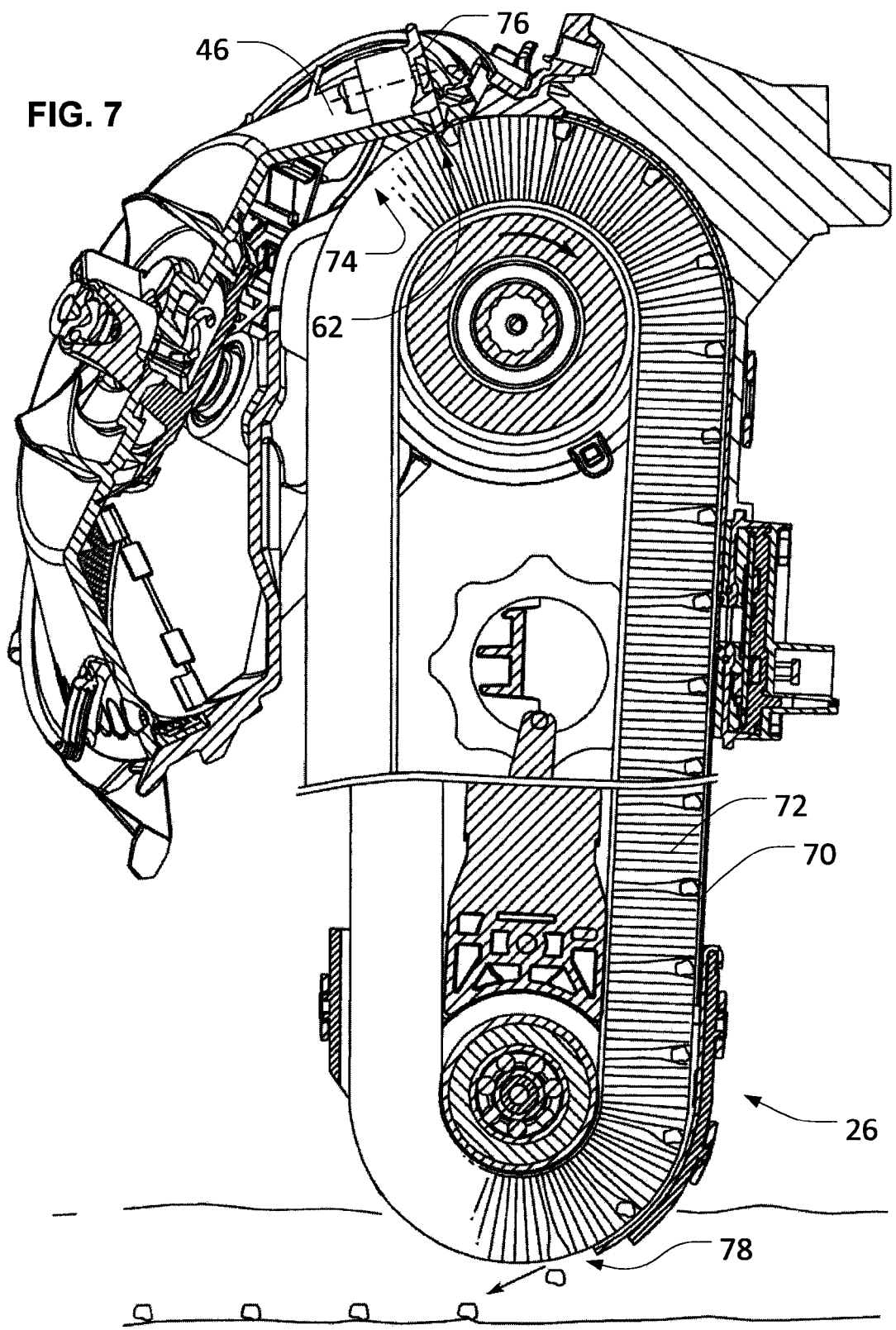
FIG. 7 is a side sectional view of aspects of one embodiment of the seed meter and seed delivery system.

Referring also to FIGS. 7 and 8A, delivery system 26 may include housing 70 partially enclosing bristles 72, which may generally travel in a clockwise direction (in FIG. 7) within housing 70. Upper opening 74 may be formed in housing 70 in order to allow seed to enter housing 70 (e.g., from metering member 46). Bristles 72 may extend through opening 74 in order to receive seed from metering member 46. (As also noted above, "upper" and similar descriptions may be utilized with respect to a particular orientation of delivery system 26 depicted in the various figures, and other configurations may also be possible. For example, delivery system 26 may be oriented horizontally, or otherwise angled with respect to vertical, in which case opening 74 may be viewed as generally as an inlet opening to delivery system 26.)

Ejector 76 may ride on the outer surface of metering member 46, with projections from a star wheel on ejector 76 extending, sequentially, into apertures 56 in order to force seed out of apertures 56. Ejector 76, which may be biased against metering member 46 with a spring (not shown) may, accordingly, "walk" along metering member 46 such that successive projections of the star wheel sequentially eject seeds, at release position 62, from successive apertures 56. These ejected seeds may be captured by rotating bristles 72 and thereby carried to seed ejection point 78.

As noted above, metering member 46 may be intended to carry seeds individually and sequentially between seed pool 60 and release position 62 (e.g., to carry a single seed between each pair of paddles 64, secured by vacuum through the associated aperture 56). In various instances, however, multiple seeds from seed pool 60 may become lodged between a pair of paddles 64. As noted above, this may be referred to as a "seed double" (although, in various instances, more than two seeds may be included). The presence of such seed doubles may detrimentally affect the efficiency and efficacy of a planting operation.

Referring particularly to FIG. 8A, metering member 46 is depicted with an example seed-double eliminator. It will be understood that various other configurations may be possible, and that a seed-double eliminator contemplated by this disclosure may be utilized with a variety of seeding (and other) machines.

As depicted in FIG. 8A, metering member 46 may carry various seeds (e.g., seeds 80) along seed path 82 (e.g., a generally circular path along rim portion 54 of metering member 46, as indicated in FIG. 8A by dashed lines), which may generally extend from seed pool 60 to release position 62 in a counter-clockwise direction (as depicted in FIG. 8A). (It will be understood that the boundaries of seed path 82 may be indicated only approximately in the various figures, and that in various instances and embodiments seeds 80 may be carried in the direction of path 82 wholly, partially, or not at all between the arrows representing path 82 in the figures.)

A seed-double eliminator may include various flexible extensions (e.g., brushes 84), which may extend radially toward seed path 82. In certain embodiments, brushes 84 (or other flexible extensions of a seed-double eliminator) may extend into seed path 82. In certain embodiments, brushes 84 (or other flexible extensions of a seed-double eliminator) may not extend into seed path 82. Further, although various brushes 84 may be depicted in FIG. 8A as generally extending the same distance toward seed path 82, in other configurations various brushes 84 (or other flexible extensions) of a particular seed-double eliminator may extend various different distances toward seed path 82. For example, successive brushes (with respect to movement of a seed along seed path 82) may extend successively farther toward (and, potentially, into) seed path 82, in order to provide successively more aggressive contact with potential seed doubles.

By way of their extension toward (and, potentially, into) seed path 82, brushes 84 may come into contact with seed being carried along seed path 82 by metering member 46 (again, in a counter-clockwise direction, as depicted in FIG. 8A). In certain embodiments, brushes 84 may be configured such that they either do not contact single seeds being carried between a set of paddles 64 or do not contact single seeds with sufficient force to dislodge the seeds from seed path 82 (e.g., with force that is insufficient to overcome the vacuum applied to a seed via aperture 56). Brushes 84 may also be configured such that when a seed double is carried between paddles 64 (or otherwise), brushes 84 may contact at least one seed of the seed double with sufficient force to dislodge the extra seed from seed path 82. For example, as noted above, the extension of brushes 84 toward seed path 82 may be configured such that brushes 84 do not contact single seeds (or contact single seeds with insufficient force to dislodge them from path 82), but brushes 84 do contact seed doubles (or one or more seeds included therein) with sufficient force to dislodge at least one seed included in the double from path 82. This may be possible, for example, for a particular orientation of brushes 84 and a particular seed type, because the physical arrangement of seed doubles may cause various seeds included in the double to project further out of seed path 82 than would a single seed. Further, vacuum force through aperture 56 may be less effective at retaining multiple seeds (i.e., a seed double) between paddles 64 than at retaining single seeds. Accordingly, with brush 84 configured to extend a certain distance toward seed path 82, brush 84 may tend to contact seeds within a seed double with a greater effective force, including as measured relative to a vacuum-based retention force, than the force with which it may tend to contact single seeds (if the single seeds are contacted at all).

Referring also to FIG. 8B, such contact (and non-contact) is depicted in an example configuration. As depicted in FIG. 8B, single seed 80*a* may be carried on one side of paddle 64. Due to the configuration of brush 84, as depicted, and that fact that seed 80*a* is not part of a seed double, seed 80*a* may be located close enough to the wall of metering member 46 that brush 84 may not contact seed 80*a* (or may contact seed 80*a* with a force that is insufficient to dislodge seed 80*a*), thereby allowing seed 80*a* to continue along seed path 82 (e.g., to release position 62). On the other side of paddle 64, however, a seed double including seed 80*b* (hidden by paddle 64 in FIG. 8B) and seed 80*c* (i.e., together, a seed double) may be traveling along seed path 82. Seed 80*c*, as part of the seed double, may extend relatively further away from the wall of metering member 46 (and toward brush 84) than does single seed 80*a*. This may result from various factors, including the size of seed 80*c*, the spacing between paddles 64, geometry 68 (e.g., as discussed above), and so on. Accordingly, as the seed double of seeds 80*b* and 80*c* moves along seed path 82 past brush 84, brush 84 may contact seed 80*c* with sufficient force to dislodge seed 80*c* from seed path 82 (as indicated by falling seed 80*c'*). In this way, various extra seeds of various seed doubles may be dislodged from seed path 82 by brushes 84 (or various other flexible extensions of a seed-double eliminator), while various single seeds (including single remainder seeds from a partially dislodged seed double) may continue along path 82.

It will be understood, with respect to the example above, that some contact between brush 84 and seed 80*a* may occur in various embodiments, and that such contact may not necessarily dislodge seed 80*a* from seed path 82. For example, with brushes 84 extending an appropriate distance toward seed path 82, even if the free end of brushes 84 contacts seed 80*a*, the flexible deformation of brushes 84 may be large enough to allow seed 80*a* to pass without being dislodged (particularly in light of the retaining force provided by the associated aperture 56), but small enough to allow brush 84 to remove seed 80*c* from seed meter 46.

Referring again to FIG. 8A, as seeds of various seed doubles are dislodged from seed path 82 (e.g., dislodged from between paddles 64), gravity or other forces may cause the seeds to fall toward seed deflector 86. Deflector 86 may include various deflection surfaces configured to direct such seeds back to seed pool 60 without permitting excessive bouncing of the seeds about the interior of seed meter 46 (which might, for example, detrimentally tend to dislodge other seeds from seed meter 46 as they are transported by meter 46). In this way, for example, seeds eliminated from seed doubles by brushes 84 may be efficiently directed back to seed pool 60 in order to be re-captured by seed meter 46 for transport to release position 62.

Referring also to FIGS. 9 and 10, a seed-double eliminator may be configured such that the distance that its flexible extensions (e.g., brushes 84) extend toward seed path 82 may be adjusted. This may be useful, for example, to account for different sizes of seeds that may be carried along seed path 82.

FIG. 9 depicts a seed-double eliminator within housing 30 from a generally opposite perspective from FIG. 8A. It can be seen, therefore, that metering member 46 may generally rotate clockwise, as depicted in FIG. 9. As depicted in FIG. 9, brushes 84 may extend toward (and sometimes into) seed path 82 in order to contact seed-doubles carried by metering member 46 and dislodge one or more seeds included in the double. The dislodged seeds may then be directed by various deflection surfaces of seed deflector 86 back to seed pool 60.

Referring specifically to FIG. 10, brushes 84 (or other flexible extension) may be mounted using various known means to slide member 90. Slide member 90, in turn, may be configured to be mounted to mounting fixture 92, which may itself be configured to be mounted in a fixed location radially between the metering axis M and the seed path 82. In this way, mounting fixture 92 may provide a fixed mounting point (or points) with respect to seed path 82, such that slide member 90 may be mounted to mounting fixture 92 in various configurations in order to select a particular distance that various flexible extensions (e.g., brushes 84) extend toward seed path 82.

The mounting of mounting fixture 92 relative to seed path 82 may occur in a variety of ways. In certain embodiments, mounting fixture 92 may be mounted to another component of seed meter 24. For example, mounting fixture 92 may include various posts 94 (or other mounting members) which may be configured to be retained by a snap-fit (or other connection) with housing 30 or another component of seed meter 24 (or planting unit 14). In certain embodiments, posts 94 may include various shoulders or other extensions (e.g., catches 96), which may assist in securing mounting fixture 92 to various components (or, as described below, in securing various components to mounting fixture 92). Other connection means, as understood in the art, may also be utilized.

The mounting of slide member 90 to mounting fixture 92 may also occur in a variety of ways. For example, mounting fixture 92 may include mating member 98 extending from the main body of mounting fixture 92, with side extensions 100 extending to either side of the upper portion (as depicted in FIG. 10) of mounting fixture 92. In certain embodiments, side extensions 100 may be generally trapezoidal in shape, so as to provide retaining grooves 102. Various other configurations may also be possible, and various other structural and alignment features may also be provided, such as generally semi-circular trough 104 extending generally parallel to retaining grooves 102.

Correspondingly, slide member 90 may include mating slot 106. Mating slot 106, for example, may be configured to slide over mating member 98 of mounting fixture 92, in order to secure slide member 90 to mounting fixture 92. For example, generally triangular retention tabs 108 may be configured to fit closely within retaining grooves 102, thereby allowing slide member 90 to slide onto mounting fixture 92 in a first direction while providing a retaining force in a direction normal to the first direction, which may act to hold slide member 90 and mounting fixture 92 together. As will be discussed in greater detail below, pinch members 110 may also be provided, in order to assist in securing slide member 90 to (and releasing slide member 90 from) mounting fixture 92.

Various other structural and alignment features may also be provided, such as cross-members 112, which may be configured to provide structural support to slide member 90, and semi-circular contour 114, which may be configured to assist in aligning slide member 90 for attachment to mounting fixture 92 (e.g., via alignment of contour 114 with trough 104) and in resisting lateral movement of slide member 90 with respect to mounting fixture 92 when the member 90 and fixture 92 are mounted together.

In certain embodiments, other features may also be included. For example, paddle 116 may be included on arm 118 extending away from the main body of mounting fixture 92. Paddle 116 may, for example, assist in directing seeds back toward seed pool 64 after the seeds are dislodged from seed path 82 by brushes 84. For example, paddle 116 may be configured to be located generally downstream of brushes 84 with respect to the path of travel of seeds along seed path 82. In this way, paddle 116 may act to intercept seeds that are dislodged from path 82, but, due to their inertia, still continue in a generally clockwise (in FIG. 9) path of travel, and to deflect those seeds back toward seed pool 60 (or deflector 86).

Figure 11:
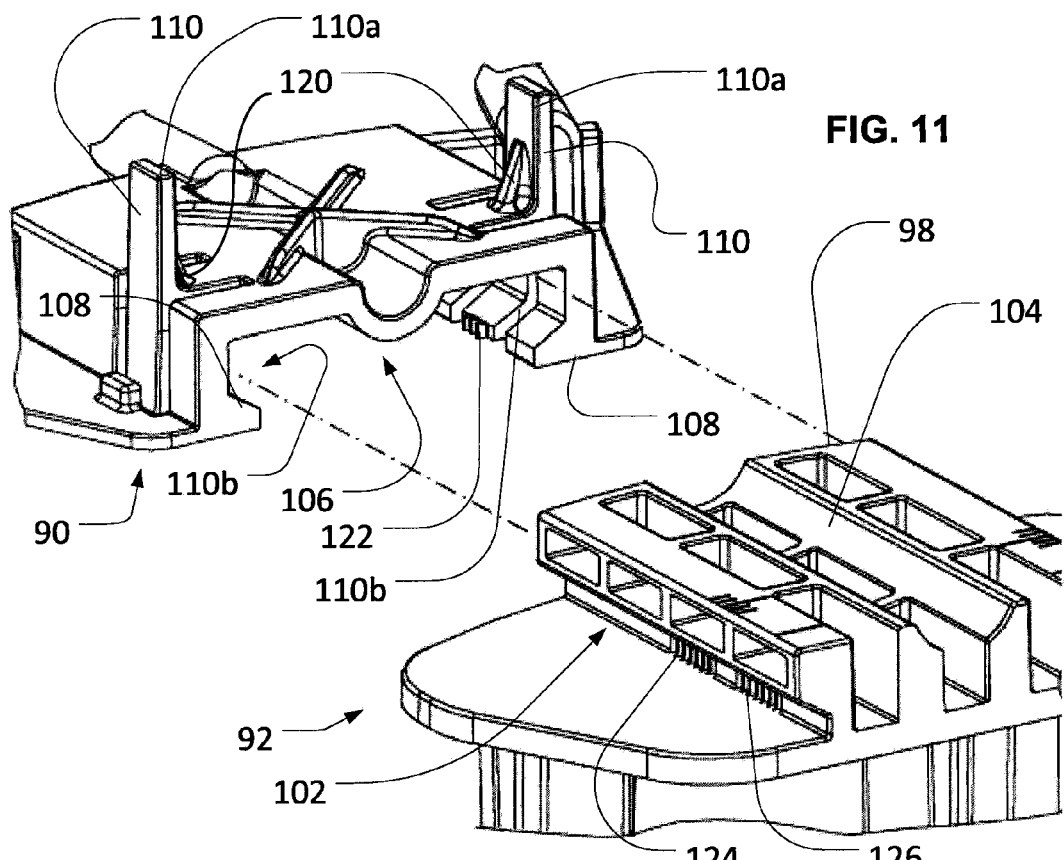
FIG. 11 is an enlarged view of a portion of the mounting fixture and slide member of FIG. 10.
Figure 12:
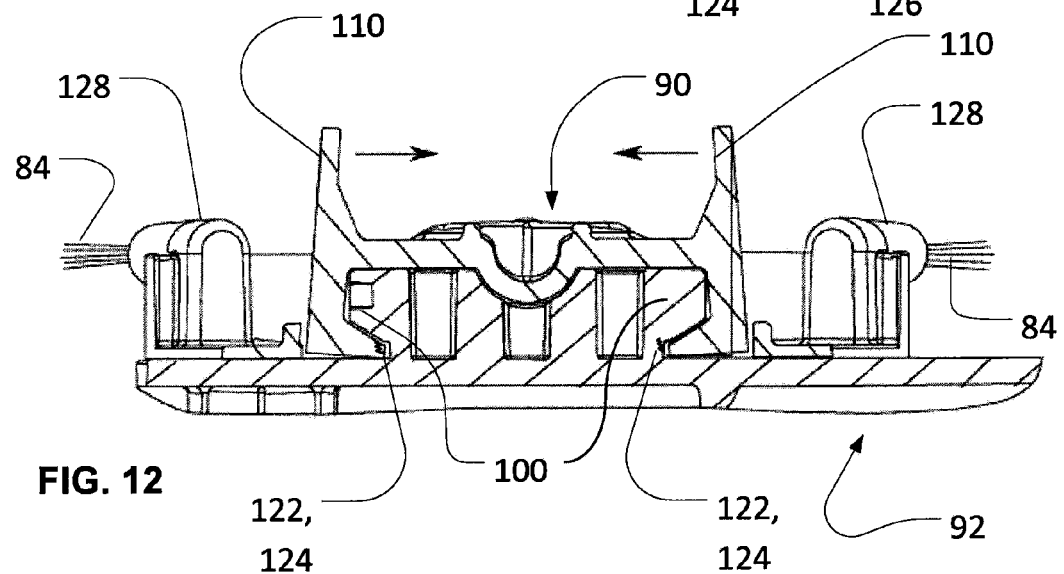
FIG. 12 is a sectional view of the mounting fixture and the slide member of FIG. 11, taken along plane A-A of FIG. 10.

Referring also to FIGS. 11 and 12, an example mechanism for adjusting the distance that brushes 84 extend toward seed path 82 is depicted. For example, pinch members 110 may be configured such that when a force is applied urging upper ends 110*a* of pinch members 110 towards each other (e.g., as indicated by arrows in FIG. 12), lower ends 110*b* may tend to move away from each other. (It will be understood that in this, and other, contexts, the use of "upper" and "lower" may indicated merely an orientation with respect to the particular figure under discussion rather than necessarily an operational orientation with respect to ground.) In certain embodiments, biasing members 120 may be provided to generally urge upper ends 110*a* of pinch members 110 away from each other.

As can also be seen in FIG. 11, lower ends 110*b* of pinch members 110 may include various engagement portions 122, which may assist pinch members 110 in engaging mounting fixture 92 in order to secure slide member 90 to mounting fixture 92. In certain embodiments, as depicted in FIG. 11, engagement portions 122 may be contoured with various geometries (e.g., with teeth, ridges, grooves, bumps, detent pins, detent holes, and so on). Further, corresponding engagement portions 124, 126 may be provided within retaining grooves 102 of mounting fixture 92. (As depicted in FIG. 11, only one of grooves 102 is visible. It will be understood that engagement portions 124, 126 may correspond with similarly located and configured engagement portions on the hidden groove 102.) In certain embodiments, engagement portions 124, 126 may also include contours of various geometries (e.g., with teeth, ridges, grooves, bumps, detent pins, holes, and so on), which may be configured to mate with the contours of engagement portions 122. In this way, through the alignment of contoured (or other) engagement portions 122 of pinch members 110 with either of contoured (or other) engagement portions 124 or 126 within retaining grooves 102, slide member 90 may be securely fixed to mounting fixture 92 at a particular orientation.

Among other benefits, this type of configuration may allow for adjustment of the distance that brushes 84 (or other flexible members attached to slide member 90) may extend toward seed path 82, as may be useful to address seeds of different sizes. For example, with engagement portions 122 meshed with engagement portions 124 (as depicted in FIG. 12), brushes 84 may extend farther toward seed path 82 than if engagement portions 122 were meshed with engagement portions 126. As such, a user may utilize pinch members 110 in order to adjust the configuration of brushes 84 with respect to seed path 82 (e.g., in order to account for different seed sizes).

It will be understood that various other adjustment mechanisms may be possible. For example, brushes 84 (or other flexible extensions) may alternatively (or additionally) be configured to slide within (or with) a mount (or mounts) connecting brushes 84 to slide member 90 (e.g., tubular mounts 128), or may be otherwise adjustable with respect to slide member 90 or mounting fixture 92. Likewise, various other adjustment mechanisms may be provided for slide member 90, mounting fixture 92, or both, in order to determine the distance various flexible extensions (e.g., brushes 84) extend into seed path 82, the path a dislodged seed may be directed through to return to seed pool 60, clearances between various parts of the disclosed seed-double eliminator and other components of the associated planter, and so on.

Figure 13:
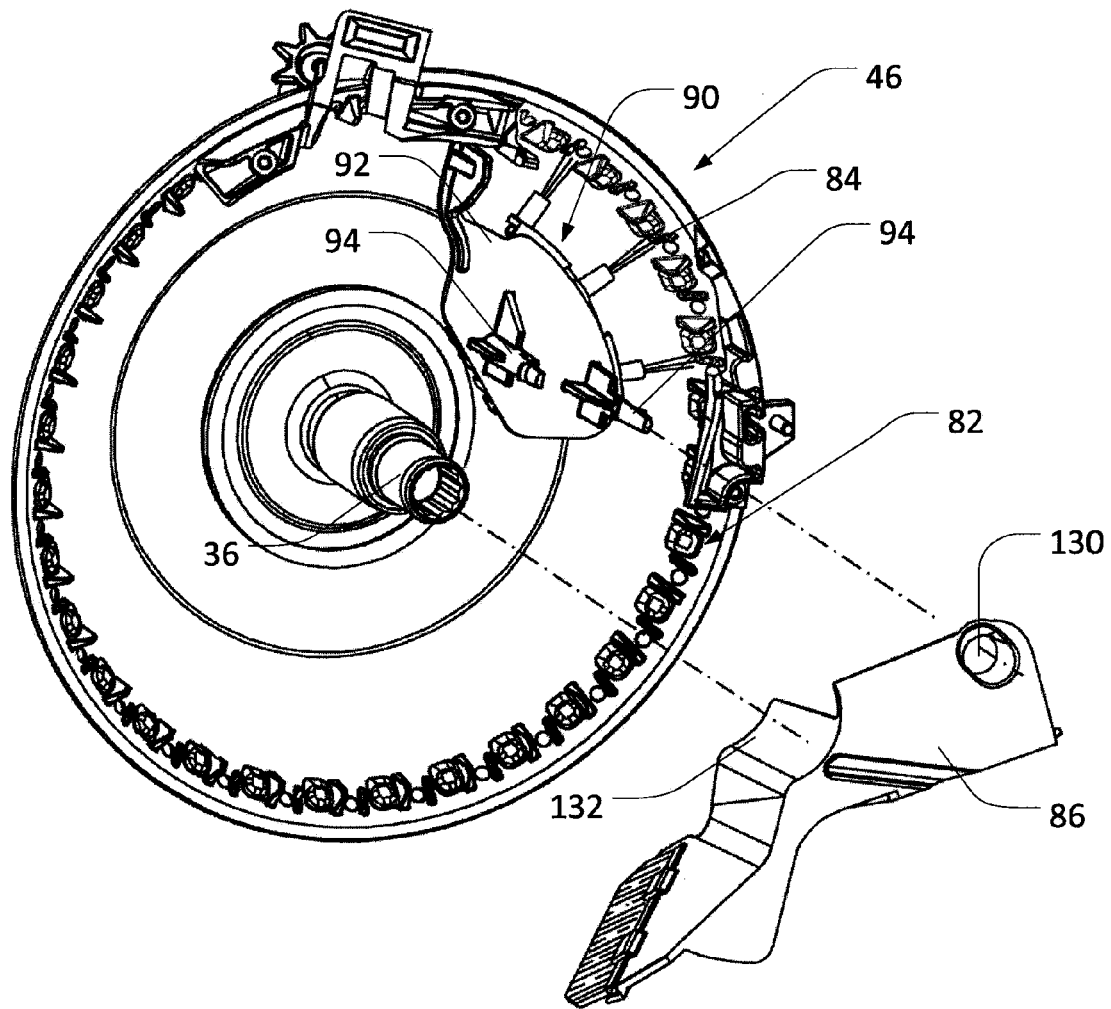
FIG. 13 is an exploded perspective view of certain internal components of the seed meter of FIG. 4, including a seed deflector, taken from a similar perspective as FIG. 8A.
Figure 14:
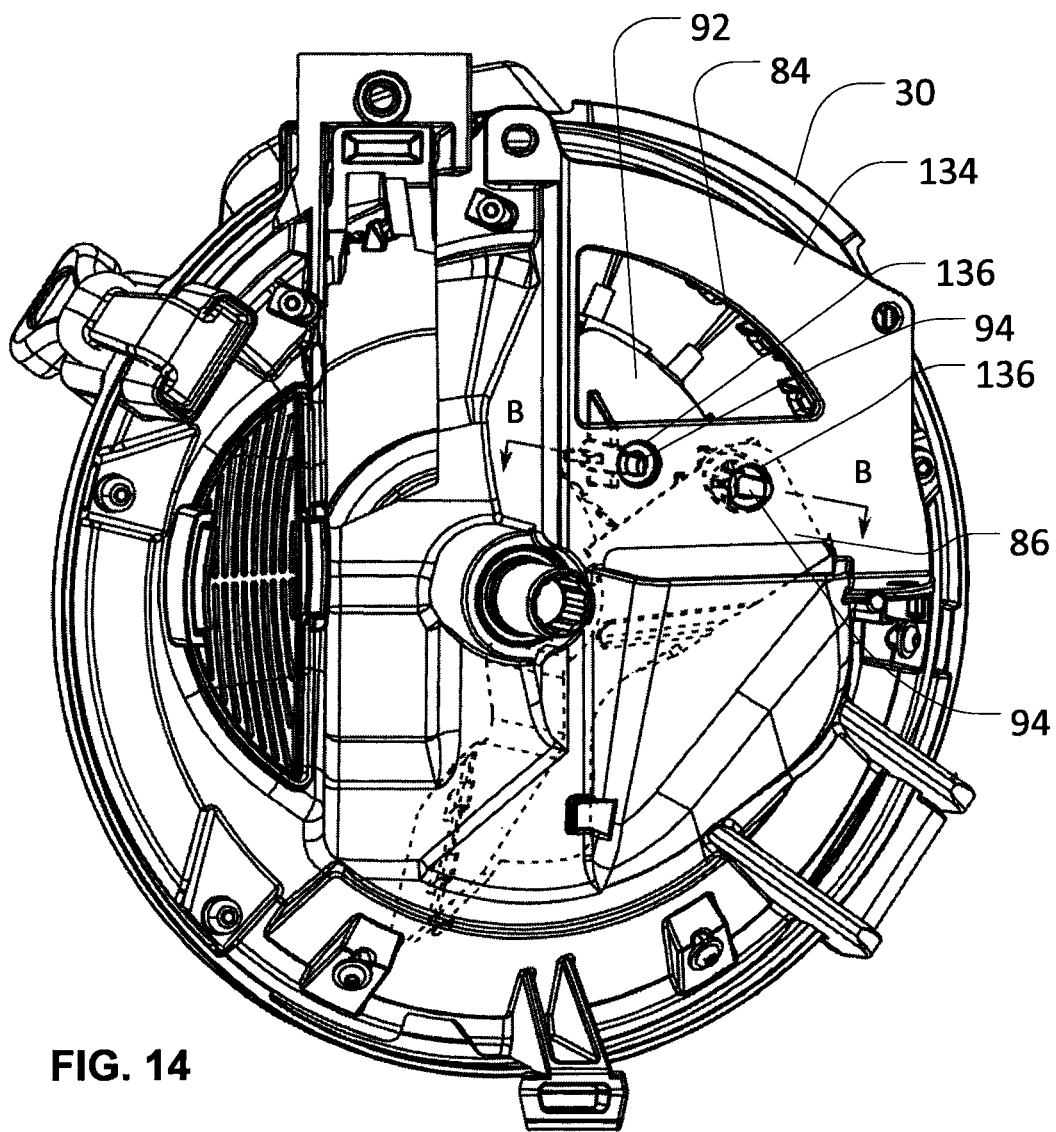
FIG. 14 is a perspective view of certain internal components of the seed meter of FIG. 4, including a seed deflector, taken from a similar perspective as FIG. 8A.
Figure 15:
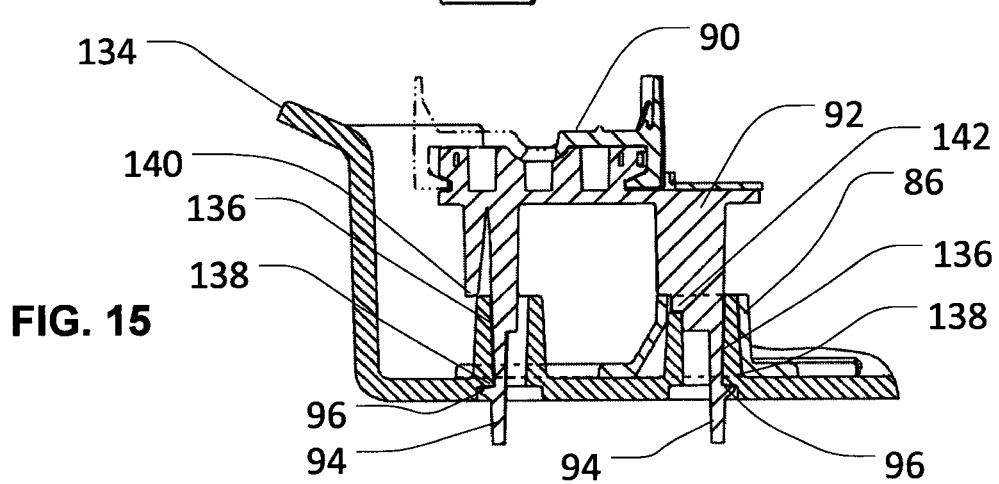
FIG. 15 is a sectional view of the seed deflector of FIGS. 13 and 14 and the mounting fixture and slide member of FIG. 10, taken along plane B-B of FIG. 14.

As also noted above, a contemplated seed-double eliminator may also include a seed deflector (e.g., deflector 86). Referring also to FIGS. 13 through 15, in certain embodiments, deflector 86 may be configured to be mounted to one or more of posts 94 of mounting fixture 92. For example, deflector 86 may include mounting hole 130, which may be configured to receive post 94 (or a portion thereof) in order to, at least in part, hold deflector 86 in an appropriate orientation with respect to brushes 84, seed path 82 and so on. Deflector 86 may also (or alternatively) be configured to be mounted into an appropriate position using, at least in part, spindle 36 of seed meter 24. For example, deflector 86 may include rounded contour 132, configured to surround, at least in part, spindle 36.

As can be seen in particular in FIG. 14, various components may partially (or wholly) enclose deflector 86 (depicted in dotted lines in FIG. 14), mounting fixture 92, or slide member 90 within housing 30. For example, mounting plate 134 may extend from (or be attached to) housing 30 and may partially enclose deflector 86, mounting fixture 92, and slide member 90, from the perspective of FIG. 14. Mounting plate 134 may include, for example, various holes 136, through which posts 94 may extend when mounting plate 134 is secured in place (e.g., secured to housing 30).

As can be seen in FIG. 15, in certain embodiments, holes 136 of mounting plate 134 may include shoulders 138, which may be configured to retain mounting fixture 92 to mounting plate 134 via contact between shoulders 138 of holes 136 and catches 96 of posts 94. Such a configuration, for example, may facilitate easy assembly of the disclosed seed-double eliminator, at least in part, by allowing mounting fixture 92 to be snapped into place with respect to mounting plate 134 (or vice versa). In certain embodiments, deflector 86 may be secured between mounting fixture 92 and mounting plate 134, with extensions of deflector 86 contacting shoulders 140 and 142 of mounting fixture 92 in order to further fix deflector 86 with respect to mounting fixture 92. (In certain embodiments, various such shoulders 140 and 142 may be provided, in order to accommodate various configurations of seed meter 24, deflector 86, mounting plate 134, and so on.) This may also facilitate easy assembly, at least in part, as deflector 86 may be simply slid into place on posts 94 (e.g., also using spindle 36 and contour 132 for alignment) before mounting fixture 92 is snapped onto mounting plate 134.

Figure 16:
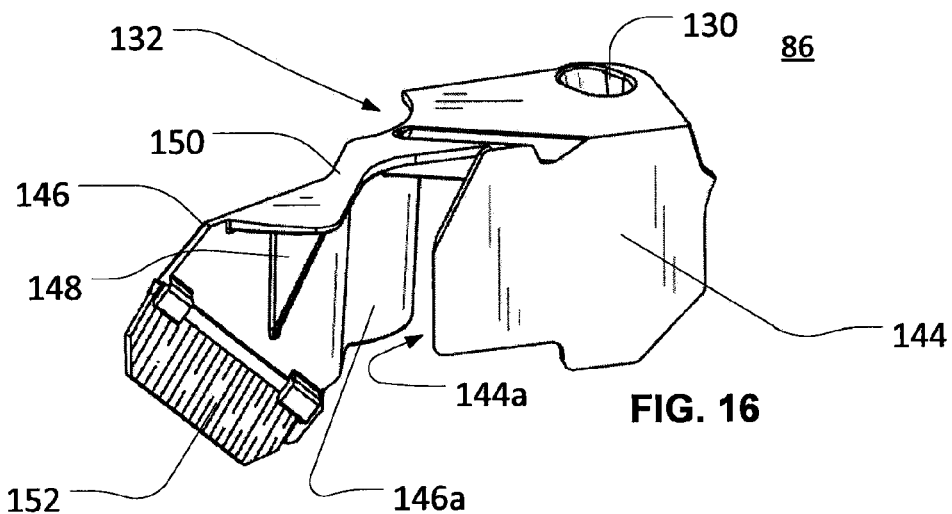
FIGS. 16-18 are perspective views of the seed deflector of FIGS. 13 and 14.
Figure 17:
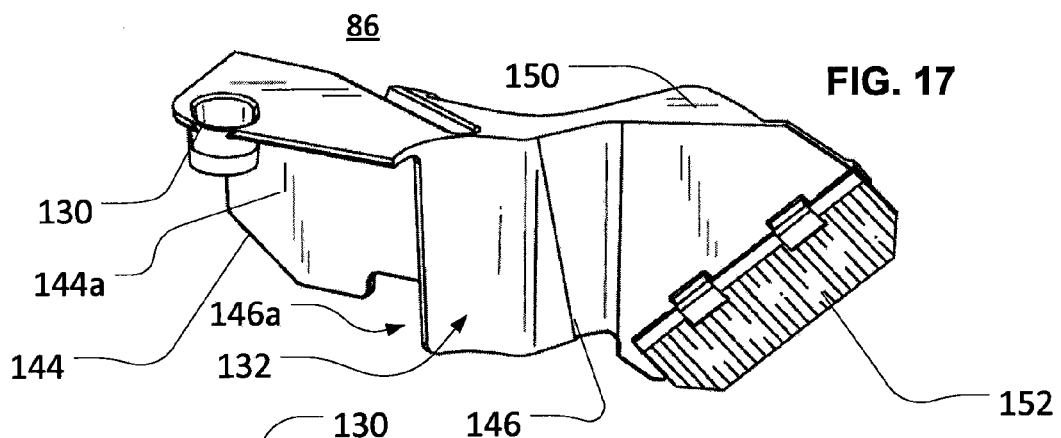
Figure 18:
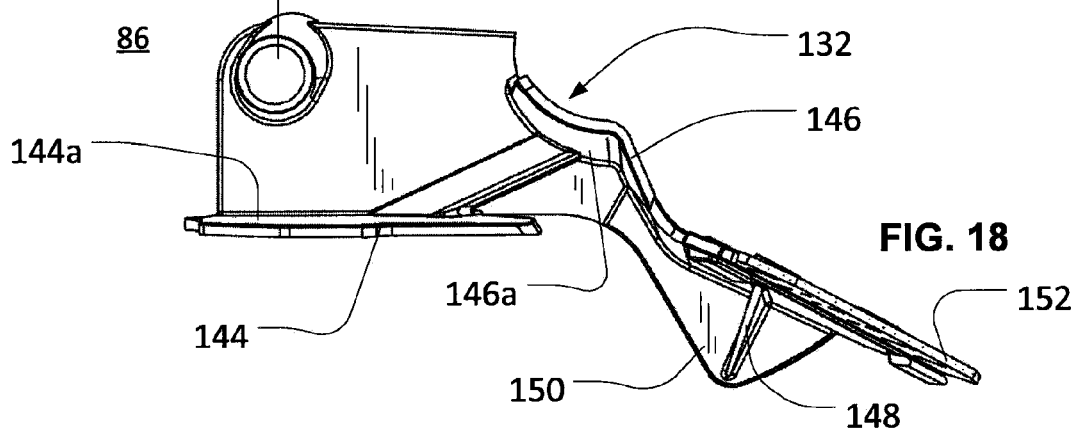

Referring also to FIGS. 16-18, deflector 86 may include various deflection surfaces and other features. For example, deflector 86 may include deflection feature 144, upper deflection surface 144*a* of which (referring again, for example, to FIGS. 8A and 9) may be angled away from horizontal in order to direct a seed that has been dislodged from seed path 82 by brushes 84 back toward seed pool 60. Likewise, deflector 86 may include deflection feature 146, which may be somewhat below deflection feature 144 (at least in part), deflection surface 146*a* of which may be angled (at least in part) with respect to deflection surface 144*a*. Either of deflection surfaces 144*a* and 146*a* (or other surfaces of deflection features 144 and 146) may be configured with various contours and angles, including various curved geometries, as depicted for surface 146*a*.

Other features may also be included. In certain embodiments, various supportive structures, which may also act to deflect seeds moving across deflector 86, may be included. For example, rib 148, extending between surface 146*a* and side wall 150 may be provided, which may both interact with seeds moving across deflector 86 and provide structural support to side wall 150 (and deflector 86 generally). Various features may also be provided which may interact with seeds within seed pool 60. For example, extension 152 may be provided on deflector 86 and may extend into seed pool 60. Extension 152 may be configured, for example, as a hinged flap, flexible member (not shown), brush (e.g., as a hinged flap configured as a brush, as depicted in the various figures), or otherwise. Among other benefits, such configurations may allow extension 152 (e.g., as brush 152) to interact with seeds in seed pool 60 without entirely blocking the passage of such seeds past extension 152.

As also noted above, the depicted configuration of deflector 86 (and other possible configurations) may generally direct seeds back to seed pool 60 after the seeds are removed from seed path 82 by brushes 84. For example, a seed removed from seed path 82 by brushes 84 may (including after contacting paddle 116) fall onto deflection feature 144 and be directed by deflection surface 144a (or other surfaces) downward toward deflection feature 146. Continuing, the seed may then be directed by deflection surface 146a (or other surfaces) downward toward seed pool 60.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

For example, the general orientation of the seed meter and delivery system can differ from that depicted in the figures. In particular, the figures illustrate a generally vertically oriented delivery system. However, the delivery system can instead be generally horizontal or an arbitrary angle to the horizon. Therefore, any words of orientation, such as various forms of "up", "down", "top", "bottom," "above," and "below", used herein are for the purpose of describing particular embodiments only and are not intended to be limiting of the disclosure.

Accordingly, various embodiments and implementations other than those explicitly described are within the scope of the following claims.

What is claimed is:

1. A seed-double eliminator for a seeding machine that is configured to move seed along a seed path by a metering member that moves about a metering axis, the seed-double eliminator comprising:
   a mounting fixture mounted in a fixed position relative to the seed path radially between the metering axis and the seed path;
   a slide member mounted to the mounting fixture to slide in a radial direction with respect to the seed path; and
   one or more flexible extensions extending from the slide member toward the seed path;
   wherein the one or more flexible extensions contact at least one seed of a seed-double pair being moved along the seed path by the seeding machine in order to remove the at least one seed from the seed path;
   wherein, with the slide member in a first mounting position relative to the mounting fixture, the one or more flexible extensions extend radially a first distance toward the seed path; and
   wherein, with the slide member in a second mounting position relative to the mounting fixture, the one or more flexible extensions extend radially a second distance toward the seed path, the second distance being different from the first distance.

2. The seed-double eliminator of claim 1, wherein a first of the one or more flexible extensions is angled with respect to a second of the one or more flexible extensions.

3. The seed-double eliminator of claim 2, wherein a third of the one or more flexible extensions is angled with respect to the first and the second flexible extensions.

4. The seed-double eliminator of claim 1, further comprising:
   one or more pinch members included in the slide member;
   wherein, at a first orientation of the one or more pinch members, the one or more pinch members fix the slide member relative to the mounting fixture; and
   wherein, at a second orientation of the one or more pinch members, the one or more pinch members permit the slide member to slide relative to the mounting fixture.

5. The seed-double eliminator of claim 4, wherein at least one of the one or more pinch members includes a first contoured engagement portion; and
   wherein the mounting fixture includes at least a second contoured engagement portion, the second contoured engagement portion being configured to engage with the first contoured engagement portion to fix the slide member in a first mounting position relative to the mounting fixture when the at least one of the one or more pinch members is in the first orientation.

6. The seed-double eliminator of claim 5, wherein the mounting fixture includes a third contoured engagement portion, the third contoured engagement portion being configured to engage with the first contoured engagement portion to fix the slide member in a second mounting position relative to the mounting fixture when the at least one of the one or more pinch members is in the first orientation.

7. The seed-double eliminator of claim 1, further comprising:
   a seed deflector located, at least in part, below the one or more flexible extensions of the slide member, the seed deflector including a first deflection surface angled, at least in part, away from horizontal in order to direct seed, at least in part, toward a seed pool included in the seeding machine.

8. The seed-double eliminator of claim 7, wherein the seed deflector further includes a second deflection surface located, at least in part, below the first deflection surface, the second deflection surface being angled, at least in part, with respect to the first deflection surface.

9. The seed-double eliminator of claim 8, wherein the seed deflector further includes a hinged flap extending from the second deflection surface into the seed pool.

10. The seed-double eliminator of claim 8, wherein the seed deflector further includes one or more of a flexible member and a brush extending from the second deflection surface into the seed pool.

11. The seed-double eliminator of claim 7, wherein the seed deflector is mounted to a portion of the mounting fixture.

12. A planter including a seeding machine that is configured to move seed along a seed path by a metering member that moves about a metering axis, the planter comprising:
  a mounting fixture mounted in a fixed position relative to the seed path radially between the metering axis and the seed path;
  a slide member mounted to the mounting fixture to slide in a radial direction with respect to the seed path; and
  one or more flexible extensions extending from the slide member toward the seed path;
  wherein the one or more flexible extensions contact at least one seed of a seed-double pair being moved along the seed path by the seeding machine in order to remove the at least one seed from the seed path;
  wherein, with the slide member in a first mounting position relative to the mounting fixture, the one or more flexible extensions extend radially a first distance toward the seed path; and
  wherein, with the slide member in a second mounting position relative to the mounting fixture, the one or more flexible extensions extend radially a second distance toward the seed path, the second distance being different from the first distance.

13. The planter of claim 12, wherein a first of the one or more flexible extensions is angled with respect to a second of the one or more flexible extensions.

14. The planter of claim 12, further comprising:
  one or more pinch members included in the slide member;
  wherein, at a first orientation of the one or more pinch members, the one or more pinch members fix the slide member relative to the mounting fixture; and
  wherein, at a second orientation of the one or more pinch members, the one or more pinch members permit the slide member to slide relative to the mounting fixture.

15. The planter of claim 14, wherein at least one of the one or more pinch members includes a first engagement portion;
  wherein the mounting fixture includes at least a second engagement portion and a third engagement portion;
  wherein the second engagement portion is configured to engage with the first engagement portion to fix the slide member in a first mounting position relative to the mounting fixture when the at least one of the one or more pinch members is in the first orientation; and
  wherein the third engagement portion is configured to engage with the first engagement portion to fix the slide member in a second mounting position relative to the mounting fixture when the at least one of the one or more pinch members is in the first orientation.

16. The planter of claim 12, further comprising:
  a seed deflector located, at least in part, below the one or more flexible extensions of the slide member, the seed deflector including a first deflection surface angled to direct seed, at least in part, toward a seed pool.

17. The planter of claim 16, wherein the seed deflector further includes a second deflection surface located, at least in part, below the first deflection surface, the second deflection surface being angled, at least in part, with respect to the first deflection surface.

18. The planter of claim 16, wherein the seed deflector further includes one or more of a hinged flap, a flexible member, and a brush extending from the second deflection surface into the seed pool.

* * * * *